US012643665B2

(12) United States Patent
Marineni et al.

(10) Patent No.: US 12,643,665 B2
(45) Date of Patent: Jun. 2, 2026

(54) BERTHING DIVAN WITH FINISHED BACKREST PANEL AND ROLLER SUPPORT MECHANISMS

(71) Applicant: B/E Aerospace, Inc., Winston-Salem, NC (US)

(72) Inventors: Lakshmana Marineni, Hyderabad (IN); Hau Ho, Pembroke Pines, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 44 days.

(21) Appl. No.: 18/795,957

(22) Filed: Aug. 6, 2024

(65) Prior Publication Data

US 2025/0223041 A1 Jul. 10, 2025

(30) Foreign Application Priority Data

Jan. 5, 2024 (IN) .............................. 202411001051

(51) Int. Cl.
B64D 11/06 (2006.01)
B64D 11/00 (2006.01)
(52) U.S. Cl.
CPC ...... B64D 11/0641 (2014.12); B64D 11/0648 (2014.12); B64D 2011/0069 (2013.01)
(58) Field of Classification Search
CPC . B64D 11/0641; B64D 11/06; B64D 11/0648; B64D 2011/0069; B60N 2/30; B60N 2/3013; B60N 2/305; B60N 2/3065; B60N 2/3095; A47C 17/80; A47C 17/17
USPC .......................................................... 5/12.1
See application file for complete search history.

(56) References Cited

U.S. PATENT DOCUMENTS

| | | | | |
|---|---|---|---|---|
| 4,018,166 | A * | 4/1977 | Gutridge ................ | B61D 33/00 297/343 |
| 6,352,309 | B1 * | 3/2002 | Beroth ................. | B64D 11/064 297/284.11 |
| 6,718,570 | B2 | 4/2004 | Brooks | |
| 8,196,236 | B2 * | 6/2012 | Smythe .............. | A47C 17/1753 5/18.1 |
| 11,059,589 | B2 | 7/2021 | Oleson et al. | |
| 11,679,882 | B2 | 6/2023 | Erhel | |
| 2017/0021930 | A1 * | 1/2017 | Henshaw ............. | B64D 11/064 |
| 2019/0127070 | A1 * | 5/2019 | Oleson ............... | B64D 11/0621 |

(Continued)

FOREIGN PATENT DOCUMENTS

EP            3000733 A1        3/2016

OTHER PUBLICATIONS

European Search Report received in EP Application No. 25150233. 2, Apr. 7, 2025, 8 pages.

Primary Examiner — J. T. Newton
(74) Attorney, Agent, or Firm — Suiter Swantz IP

(57) ABSTRACT

A berthing divan for use in a conveyance such as an aircraft. In embodiments, the berthing divan includes a frame supporting a seat bottom subassembly and a backrest subassembly coupled for synchronous motion between a seating position and a berthing position. A finished backrest panel is attached to the frame. A plurality of roller support mechanisms are attached to the backrest subassembly and are configured to roll against the backrest panel as the divan transitions between the seating position and the berthing position, and are configured to support the backrest subassembly in each of the seating position and the berthing position of the divan.

18 Claims, 12 Drawing Sheets

(56)        References Cited

U.S. PATENT DOCUMENTS

| 2020/0039651 | A1 |   | 2/2020 | Oleson et al. |   |
| 2025/0223041 | A1 | * | 7/2025 | Marineni | ........... B64D 11/0648 |

* cited by examiner

BERTHING DIVAN WITH FINISHED BACKREST PANEL AND ROLLER SUPPORT MECHANISMS

CROSS-REFERENCE TO RELATED APPLICATIONS

This nonprovisional application claims the benefit of priority of Indian Patent Application number 202411001051 filed Jan. 5, 2024 for BERTHING DIVAN WITH FINISHED BACKREST PANEL AND ROLLER SUPPORT MECHANISMS, which is hereby incorporated by reference in its entirety.

TECHNICAL FIELD AND BACKGROUND

The present disclosure relates generally to berthing divans for use in aircraft and other conveyances, and more particularly, to a berthing divan including a finished backrest panel and roller support mechanisms configured to roll against the finished backrest panel to support the backrest assembly as the backrest assembly transitions between seating and berthing positions of the divan.

Divans are commonly used in executive and private aircraft. Some divans are configured to transition between an upright position for seating and a berthing position for sleeping, through various intermediate lounge positions. In some cases, the seating position corresponds to an upright seating position for taxi, takeoff, and landing (TTOL).

Conventional divans typically include a seat bottom and a backrest coupled for synchronous movement to transition the divan between the seating position and the berthing position. The seat bottom is typically supported by a frame and is configured to translate forward and aft relative to the frame. The backrest is typically rotatably coupled to the seat bottom, supported by the frame, and configured to rotate as the seat bottom translates forward or aft. When fully berthed, the seat bottom and the backrest may be coplanar to form a bed.

In conventional divans, backrest motion is typically guided by mechanical linkages formed between the backrest and the frame. Considering the typical divan includes at least two laterally-adjacent seats, the relatively long length of the backrest necessitates the need for multiple linkages positioned along the length of the backrest in order to support the backrest motion and withstand occupant loads. Such an arrangement of linkages requires cutouts to be formed in the closeout panels and leaves portions of the linkages exposed when the divan is berthed. Cutouts and exposed linkages are not only unsightly, but introduce pinch points that can cause injury, as well as create openings in which personal items can be lost and debris can be collected. In addition, mechanical linkages add cost, weight, complexity, and noise to the construction and operation of the divan.

Therefore, what is needed is backrest tracking solution for a divan that results in a finished look when the divan is berthed.

BRIEF SUMMARY

In one aspect, embodiments of the inventive concepts disclosed herein are directed to a divan for an aircraft or other conveyance. In embodiments, the divan includes a seat bottom subassembly and a backrest subassembly coupled for synchronous motion to transition the divan between a seating position and a berthing position. A frame supports the seat bottom subassembly and the backrest subassembly. A backrest panel is attached to the frame. A plurality of roller support mechanisms are attached to the backrest subassembly and are configured to roll against the backrest panel as the divan transitions between the seating position and the berthing position, and the plurality of roller support mechanisms are configured to support the backrest subassembly in each of the seating position and the berthing position of the divan.

In some embodiments, each of the plurality of roller support mechanisms is configured to be engaged with the backrest panel when the divan is in the seating position, and each of the plurality of roller support mechanisms is configured to be engaged with the frame when the divan is in the berthing position.

In some embodiments, each roller support mechanism includes a mounting block mounted to the backrest subassembly, a roller arm rotatably coupled to the mounting block, a roller rotatably mounted at one end of the roller arm, a rotation limiter provided on the mounting block, and a biasing member positioned between the mounting block and the roller arm, the biasing member configured to bias the roller arm toward the rotation limiter.

In some embodiments, the biasing member is configured to act on the roller arm to urge the roller into rolling contact with the backrest panel as the divan transitions, and cause the roller arm to rotate into contact with the rotation limiter when the roller support mechanism is out of contact with the backrest panel.

In some embodiments, the biasing member is a torsion spring configured to store mechanical energy when the roller comes into rolling contact with the backrest panel when the backrest subassembly transitions toward the seating position.

In some embodiments, the roller arm is configured to rotate toward the mounting block as the backrest subassembly transitions toward the seating position, and rotate away from the mounting block as the backrest subassembly transitions toward the berthing position, or vice versa.

In some embodiments, wherein, when the divan is in the berthing position, the roller arm is oriented at a negative angle and further rotation of the roller arm is prevented by contact between the roller arm and the rotation limiter.

In some embodiments, the backrest panel is devoid of cutouts to provide a seamless finished look.

In some embodiments, the divan defines at least three seat positions and comprises at least three roller support mechanisms positioned in spaced apart relation. For example, the divan may four roller mechanisms for three seat positions.

In another aspect, embodiments of the inventive concepts disclosed herein are directed to a berthing divan for an aircraft comprising at least two seat positions. In embodiments, the berthing divan includes a seat bottom subassembly and a backrest subassembly coupled for synchronous motion to transition the berthing divan between a seating position and a berthing position, a fixed headrest assembly, and a frame supporting the seat bottom subassembly, the backrest subassembly, and the fixed headrest. A backrest panel is attached to the frame. A plurality of roller support mechanisms are attached to the backrest subassembly and are configured to roll against the backrest panel as the berthing divan transitions between the seating position and the berthing position, and are configured to support the backrest subassembly in each of the seating position and the berthing position of the berthing divan.

In a further aspect, embodiments of the inventive concepts disclosed herein are directed to a roller support mechanism. In embodiments, the roller support mechanism includes a mounting block configured to be mounted to a movable structure, a roller arm rotatably coupled to the mounting block, a roller rotatably mounted at one end of the roller arm, a rotation limiter provided on the mounting block, and a biasing member positioned between the mounting block and the roller arm, the biasing member configured to bias the roller arm toward the rotation limiter.

In some embodiments, the biasing member is configured to act on the roller arm to urge the roller into rolling contact with a fixed structure as the movable structure moves relative to the fixed structure, and cause the roller arm to rotate into contact with the rotation limiter when the roller support mechanisms are out of contact with the fixed structure, the biasing member is configured to store mechanical energy when the roller comes into rolling contact with the fixed structure when the movable structure moves toward the fixed structure, and the roller arm is configured to rotate in a first direction toward the mounting block as the movable structure moves toward the fixed structure, and rotate in a second direction opposite the first direction and away from the mounting block as the movable structure moves away from the fixed structure.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
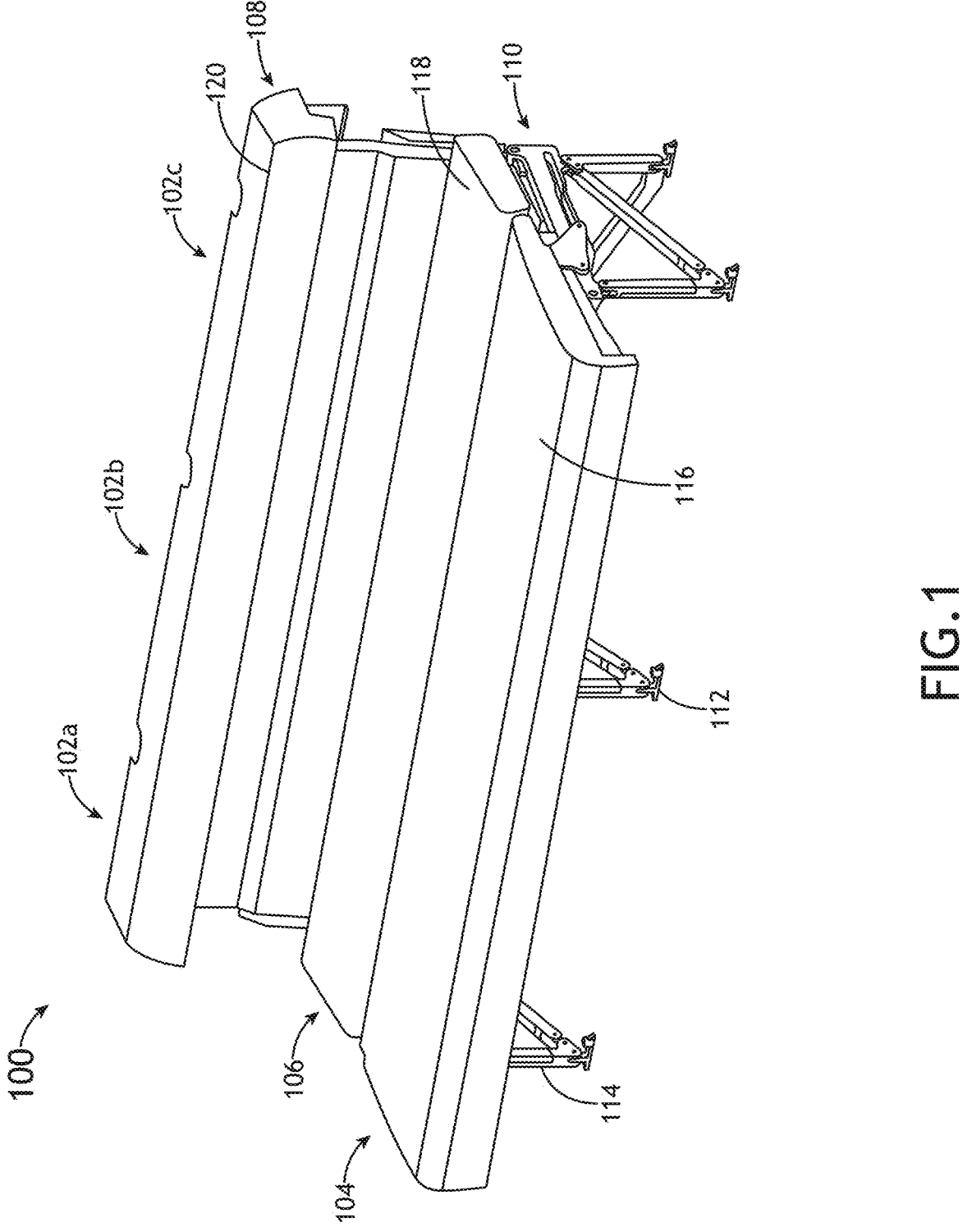
FIG. 1 is an isometric view of a divan shown in a berthing position, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a divan, and more specifically, to a berthing divan. In embodiments, the divan may be used in aircraft for seating and sleeping depending on the phase of flight. In some embodiments, the divan is a berthing divan including at least two, and more preferably three, laterally adjacent passenger seat positions. The divan may be installed in aircraft against a fuselage wall and facing an aisle, for instance a longitudinal aisle, as well as in other locations and orientations within a passenger cabin.

As compared to conventional berthing divans, advantages of the divan described and illustrated herein include, but are not limited to, less complexity in the mechanism for backrest motion, a more finished look to the divan when fully berthed, smooth and quiet backrest motion over repeated cycling, improved backrest support in each of the seating position and berthing position, serviceability, cost savings, and weight savings.

Figure 2:
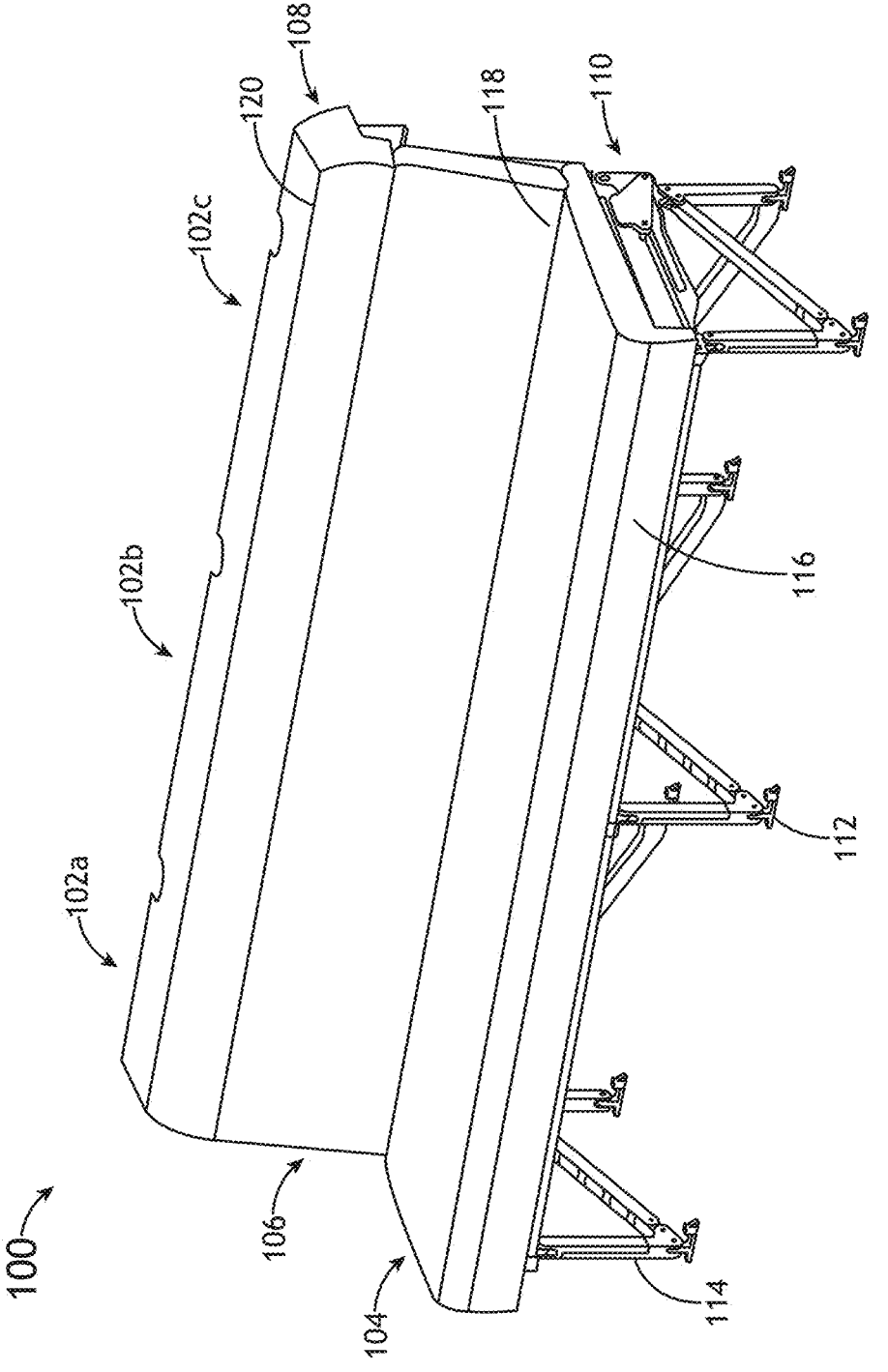
FIG. 2 is an isometric view of the divan of FIG. 1 shown in a seating position, in accordance with example embodiments of this disclosure.

FIGS. 1 and 2 illustrate the divan 100 according to the present disclosure. FIG. 1 shows the divan 100 in the berthing position forming a bed. FIG. 2 shows the divan 100 in the seating position forming a plurality of laterally adjacent passenger seats. In embodiments, the divan 100 may be further adjustable into intermediate lounge and reclined seating positions. In embodiments, the seating position may correspond to a fully upright and compliant seating position for taxi, takeoff, and landing (TTOL). The divan 100 may include two or more laterally adjacent passenger seats. As shown, the divan includes three laterally adjacent passenger seats 102a, 102b, 102c. The bounds of each passenger seat 102a, 102b, 102c may be demarcated by a break in the cushions, location of a passenger restraint, or otherwise.

The divan 100 generally includes a seat bottom subassembly 104, a backrest subassembly 106, and a headrest subassembly 108. A frame assembly 110 supports each of the seat bottom subassembly 104, the backrest subassembly 106, and the headrest subassembly 108 elevated above the floor. In embodiments, track fasteners 112 may be used to secure the legs 114 of the frame assembly 110 to seat tracks embedded in the floor. The frame assembly 110 may include, for example, spreaders, legs, transverse beams, cross-braces, etc., providing structural support and rigidity to the divan 100.

The seat bottom subassembly 104 generally includes a seat bottom frame and at least one seat bottom cushion 116 carried by the seat bottom frame. The backrest subassembly 106 generally includes a backrest frame and at least one backrest cushion 118 carried by the backrest frame. The headrest subassembly 108 generally includes a headrest frame and at least one cushion 120 carried by the headrest frame. Any of the cushions 116, 118, 120 may be covered with a dress cover that satisfies the material performance requirements for an aircraft.

In use, the divan 100 transitions from the seating position shown in FIG. 2 to the berthing position shown in FIG. 1 by translating the seat bottom subassembly in the forward direction relative to the frame assembly 110. The backrest subassembly 106 is rotatably coupled to the seat bottom, directly or indirectly, such that tracking motions of the seat bottom assembly 104 and the backrest subassembly 106 are synchronized. In some embodiments, the backrest subassembly 104 'follows' the movement of the seat bottom subassembly 104. In other words, as the seat bottom subassembly 104 translates forward, it pulls the backrest assembly 106 along with it. As discussed in detail below, the motion path of the backrest subassembly 106 includes synchronized translation and rotation such that the backrest subassembly 106 rotates toward horizontal as the divan 100 transitions from the seating position the berthing position, and rotates toward vertical as the divan 100 transitions from the berthing position to the seating position. As shown, the headrest subassembly 108 is separate from the backrest subassembly 106 and remains stationary as the divan 100 transitions back and forth between the seating and berthing positions.

Figure 3A:
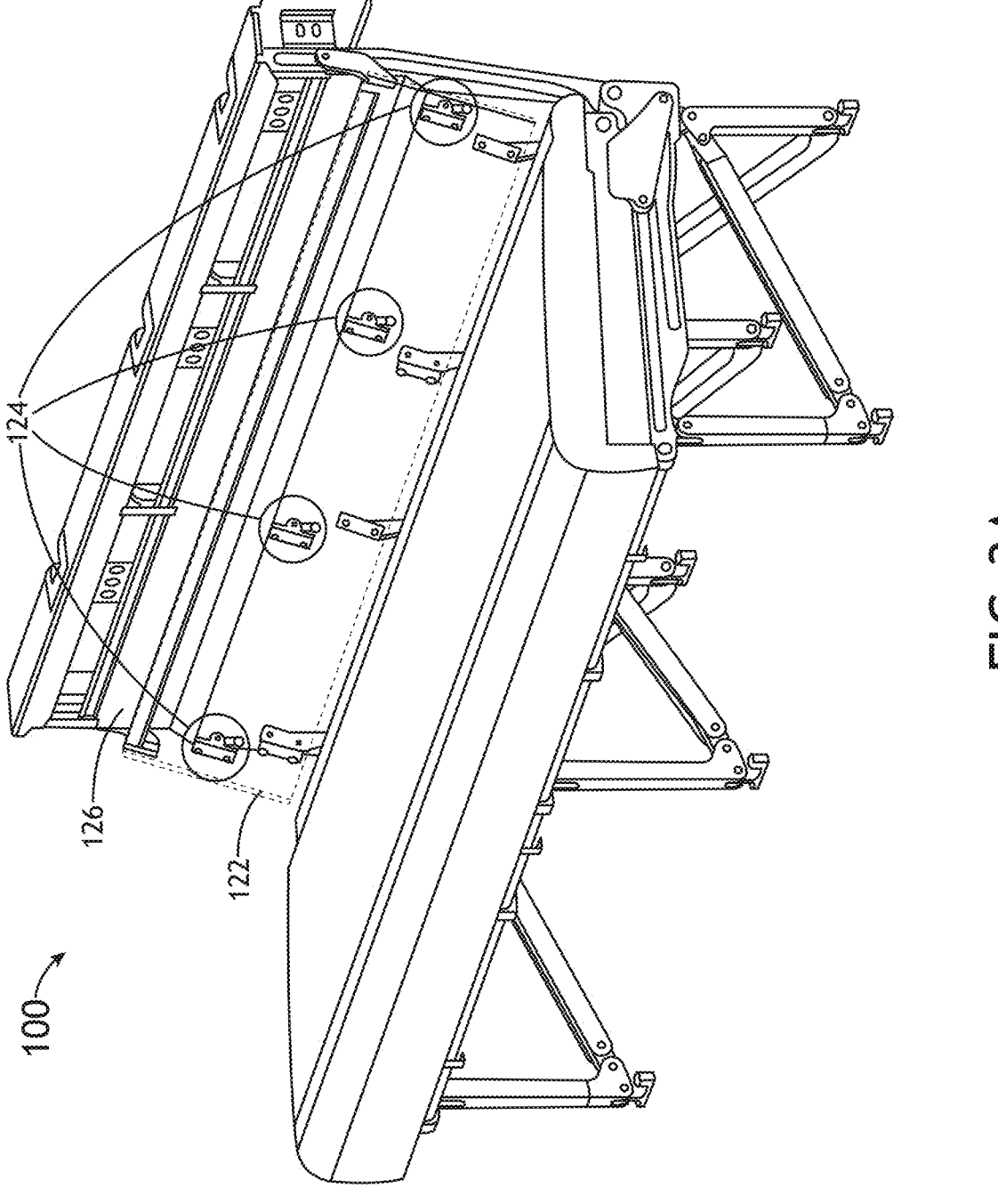
FIG. 3A is an isometric view of the divan of FIG. 1 shown with the backrest panel removed for clarity, in accordance with example embodiments of this disclosure.

FIG. 3A illustrates the divan 100 without the backrest cushion. In embodiments, the backrest frame may include an elongated panel 122 to which a plurality of roller support mechanisms 124 are mounted. As shown, the roller support mechanisms 124 are spaced apart along the length of the elongated panel 122 to withstand occupant loads and resist panel bending. In use, the roller support mechanisms 124 guide backrest subassembly motion. In some instances, the backrest subassembly may have a length greater than 6 feet depending on the number of seating positions. As shown, for example, four roller support mechanisms 124 are mounted to the panel 122 with substantially equal spacing between mechanisms.

A backrest panel 126 is attached to the frame subassembly 110. As discussed in detail below, each of the roller support mechanisms 124 rollably engages the backrest panel 126. As shown, the backrest panel 126 is continuous from end-to-end and from top-to-bottom to provide a clean and finished look to the divan 100 when berthed. In embodiments, the backrest panel 126 may include bends, but is preferably devoid of any cutouts or openings, at least the portion of the backrest panel 126 that is visible when the divan is 100 is berthed. In embodiments, the backrest panel 126 may be a sheet of aluminum, composite material, or the like. In embodiments, the backrest panel 126 and the elongated panel 122 may be substantially parallel and inclined to provide a comfortable and ergonomic backrest angle when the divan 100 is in the seating position.

Figure 3B:
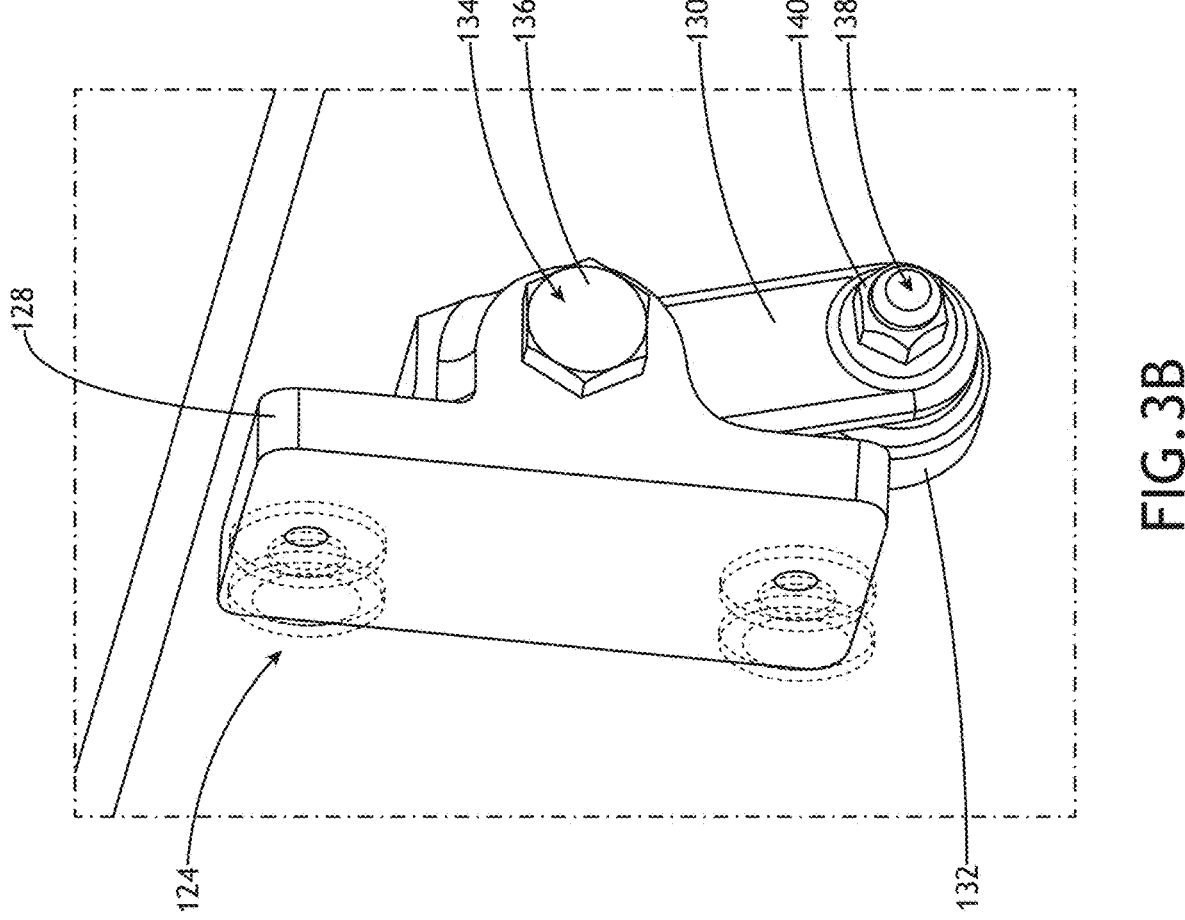
FIG. 3B is a detailed view of FIG. 3A showing a roller support mechanism, in accordance with example embodiments of this disclosure.

FIG. 3B illustrates one of the roller support mechanisms 124. Each roller support mechanism 124 is mounted to the backrest subassembly and engages the backrest panel 126 when the divan 100 is in the seating position and during a portion of the transitional motion. Each roller support mechanism 124 generally includes a mounting block 128 configured to be mounted to the backrest subassembly, a roller arm 130 rotatably attached to the mounting block 128, a roller 132 rotatably attached to one end of the roller arm 130, and a biasing member as discussed below. In use, the roller arm 130 rotates around a rotational axis 134 concentric with the fastener 136 used to attach the roller arm 130 to the mounting block 128. In embodiments, the roller 132 is vertically oriented and rotates around a rotational axis 138 concentric with the fastener 140 used to attach the roller 132 to the roller arm 130.

Figure 4A:
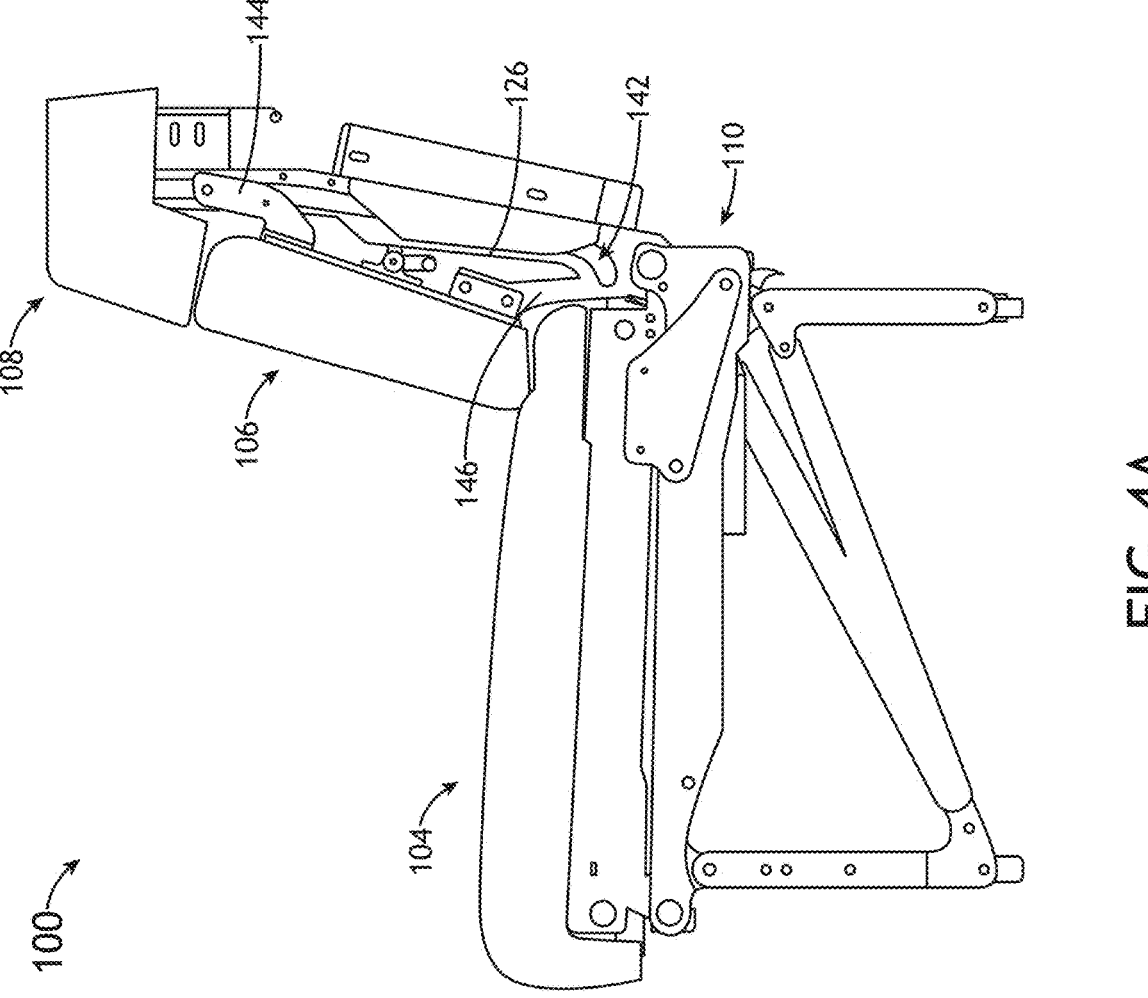
FIG. 4A is a side elevation view of the divan of FIG. 1, in accordance with example embodiments of this disclosure.

FIG. 4A illustrates the side of the divan 100 shown in the seating position. In embodiments, when the divan 100 is in the seating position the top of the backrest subassembly 106 meets the bottom of the headrest subassembly 108 to form a continuous back and headrest assembly. In embodiments, the backrest portion of the frame assembly 110 defines guideways 142 in which first backrest linkage 144 attached to the backrest travels as the divan 100 transitions. Second backrest linkage 146 may serve to rotatably couple the backrest subassembly 106 to the seat bottom subassembly 104. As shown, the first and second linkages 144, 146, which may be provided in a symmetrical arrangement on both sides of the divan 100, serve to space the backrest subassembly 106 apart from the backrest panel 126, and elevate the backrest subassembly 106 above the frame when the divan 100 is in the berthing position such that the passenger support surfaces of the seat bottom subassembly 104 and the backrest subassembly 106 are substantially coplanar when berthed. In embodiments, the guideways 142 may curve at their bottom end to urge the backrest subassembly 106 to rotate at the beginning and end of the transitional motion of the backrest subassembly 106.

Figure 4B:
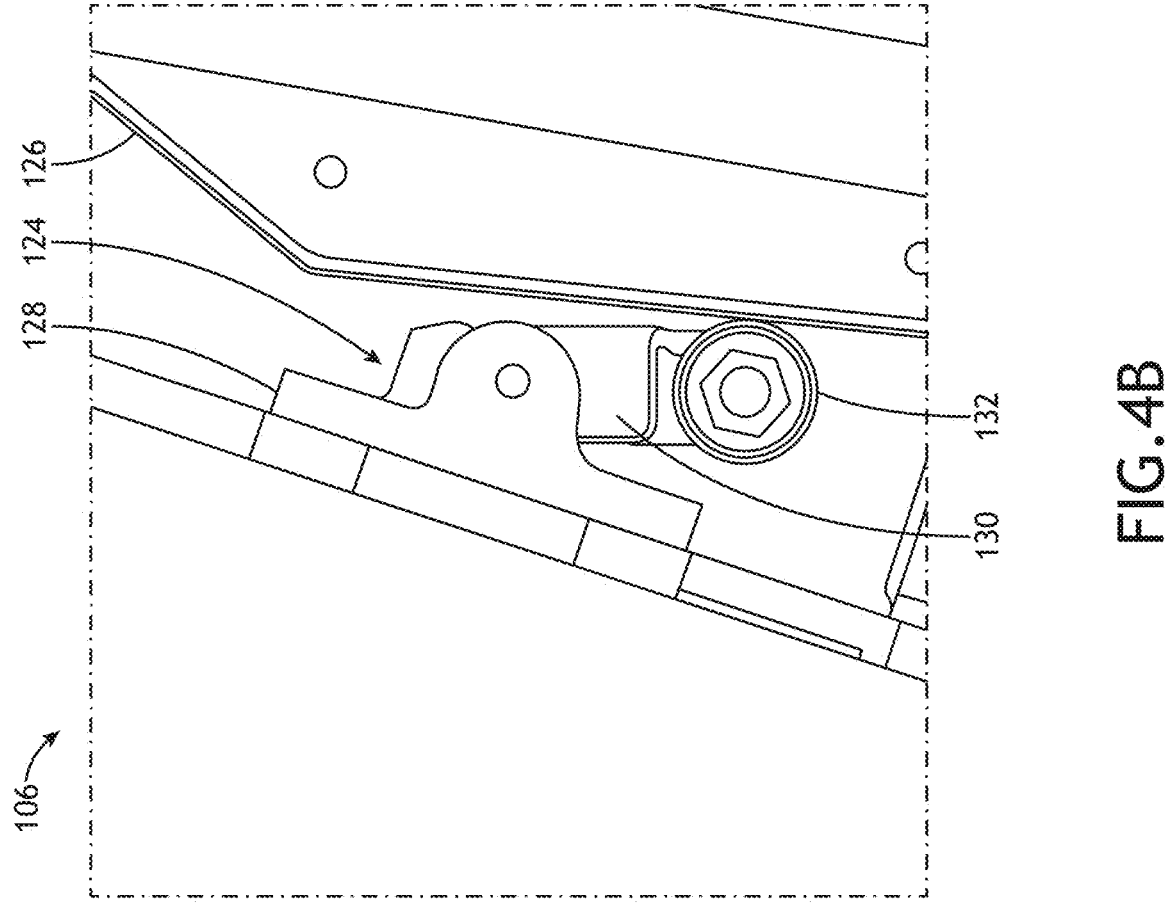
FIG. 4B is a detailed view of FIG. 4A showing roller support mechanism engagement with the backrest panel, in accordance with example embodiments of this disclosure.

FIG. 4B illustrates the configuration of one of the roller support mechanisms 124 when the divan is in the seating position. In this position, the roller arm 130 is urged to rotate clockwise toward the mounting block 128 as a result of the distance between the backrest subassembly 106 and the backrest panel 126, and the engagement of the roller 132 against the backrest panel 126.

Figure 5A:
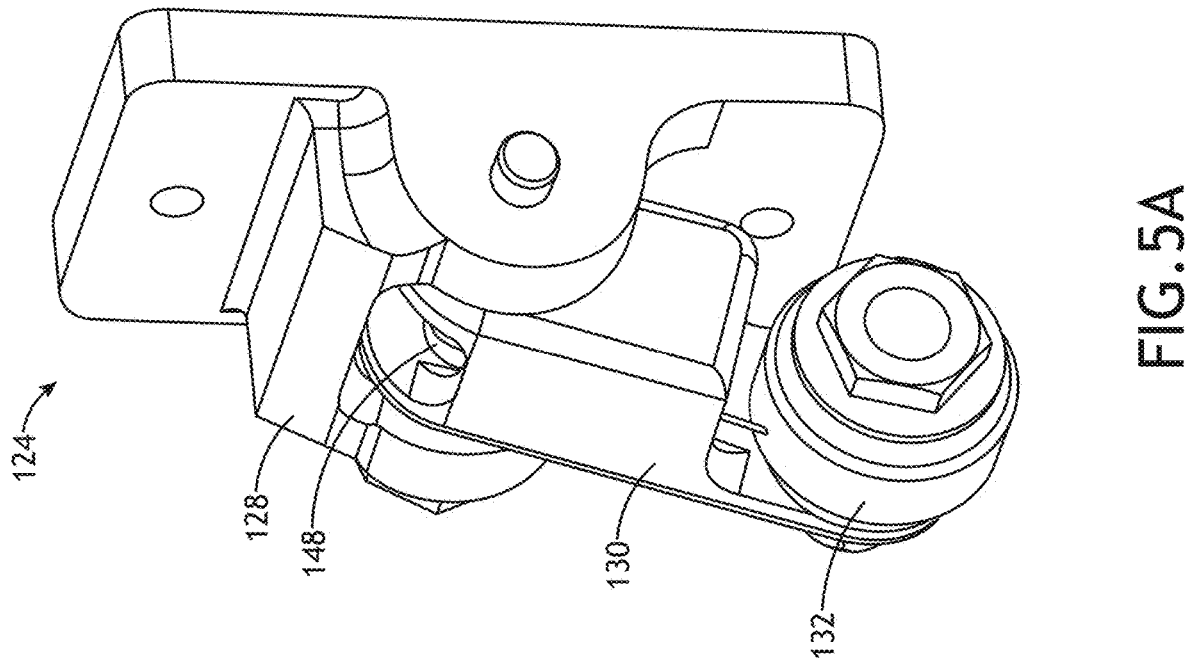
FIG. 5A is an isometric view of a roller support mechanism shown in a first position, in accordance with example embodiments of this disclosure.
Figure 5B:
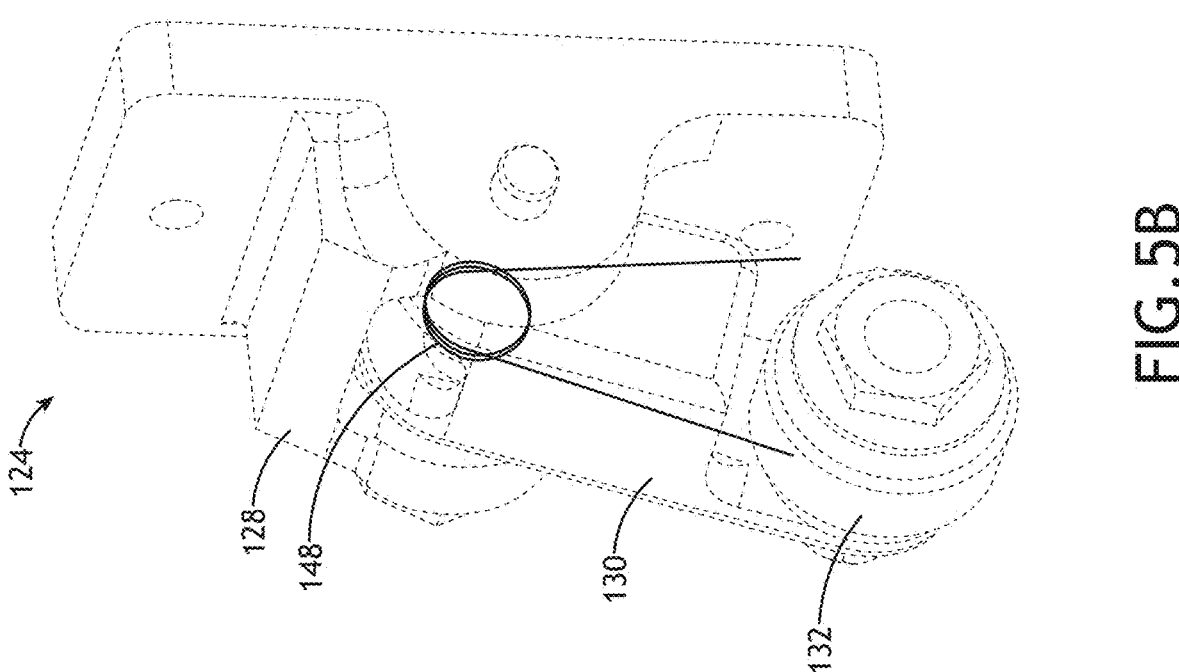
FIG. 5B is an isometric view of the roller support mechanism of FIG. 5A shown in phantom to illustrate stored spring force, in accordance with example embodiments of this disclosure.

FIGS. 5A and 5B illustrate the configuration of the roller support mechanism 124 when the divan is in the seating position. Urging the roller 132 against the backrest panel causes the roller arm 130 to rotate toward the mounting block 128 against the biasing force of a biasing element. In embodiments, the biasing element may be a torsion spring 148 that is configured to store mechanical energy when the roller 132 comes into rolling contact with the backrest panel when the backrest subassembly transitions toward the seating position. In this configuration, the roller arm 130 is configured to rotate toward the mounting block 128 as the backrest subassembly transitions toward the seating position, and rotate away from the mounting block 128 as the backrest subassembly transitions toward the berthing position.

Figure 6A:
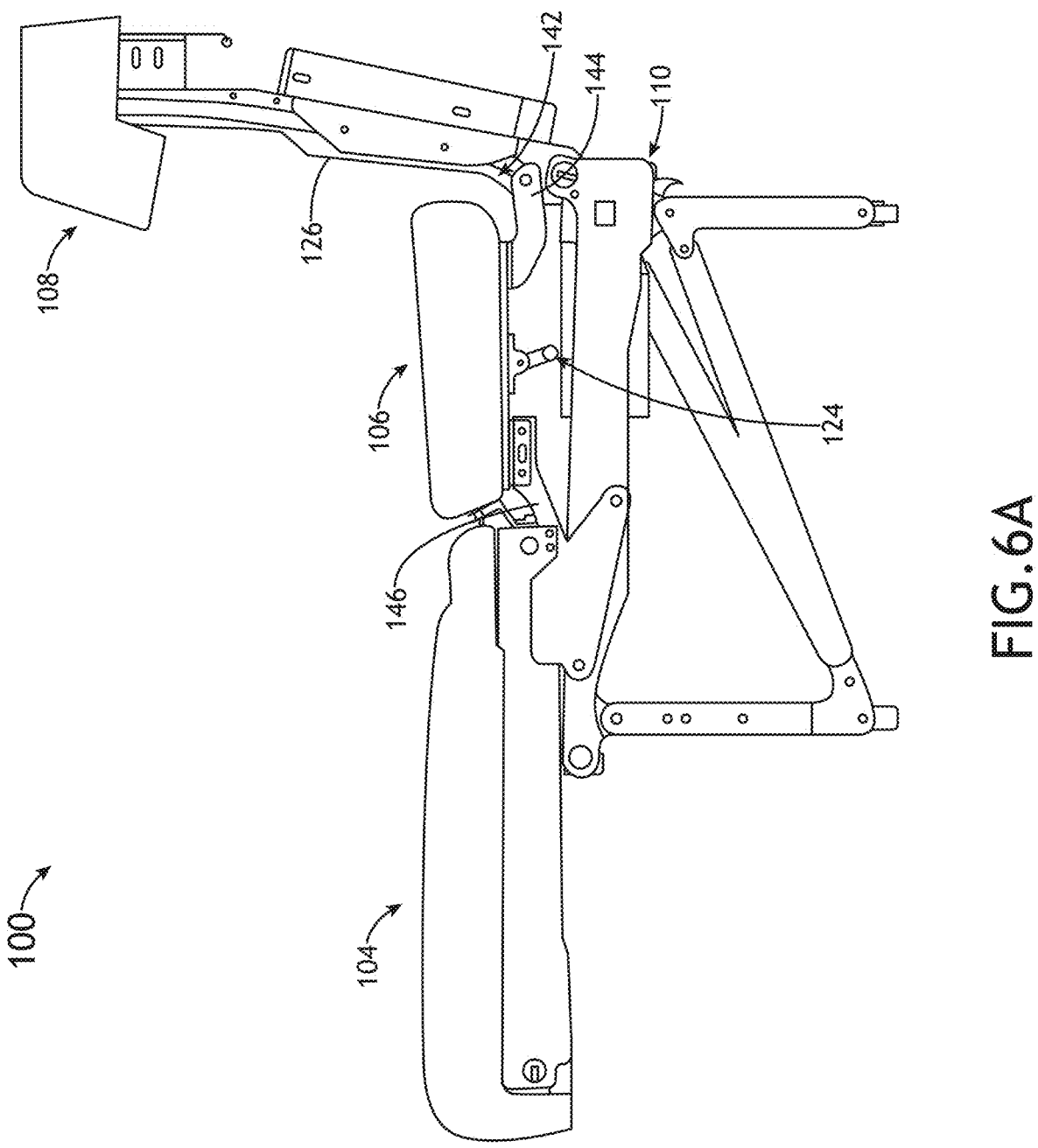
FIG. 6A is a side elevation view of the divan shown in the berthing position, in accordance with example embodiments of this disclosure.

FIG. 6A illustrates the berthing position of the divan 100. When berthed, the seat bottom subassembly 104 and the backrest subassembly 106 are substantially horizontally aligned to form a bed, which leaves the backrest panel 126 exposed. The first link 144 moves to the bottom end of the guideway 142, and the second link 146 elevates the backrest subassembly 106 above the frame subassembly 110. When berthed, the roller support mechanisms 124 reconfigure automatically to a support position as shown wherein further rotational motion of the roller arm is prevented. When in their support position, the roller support mechanisms 124 contact the frame subassembly 110 to support the backrest subassembly 106 from below.

Figure 6B:
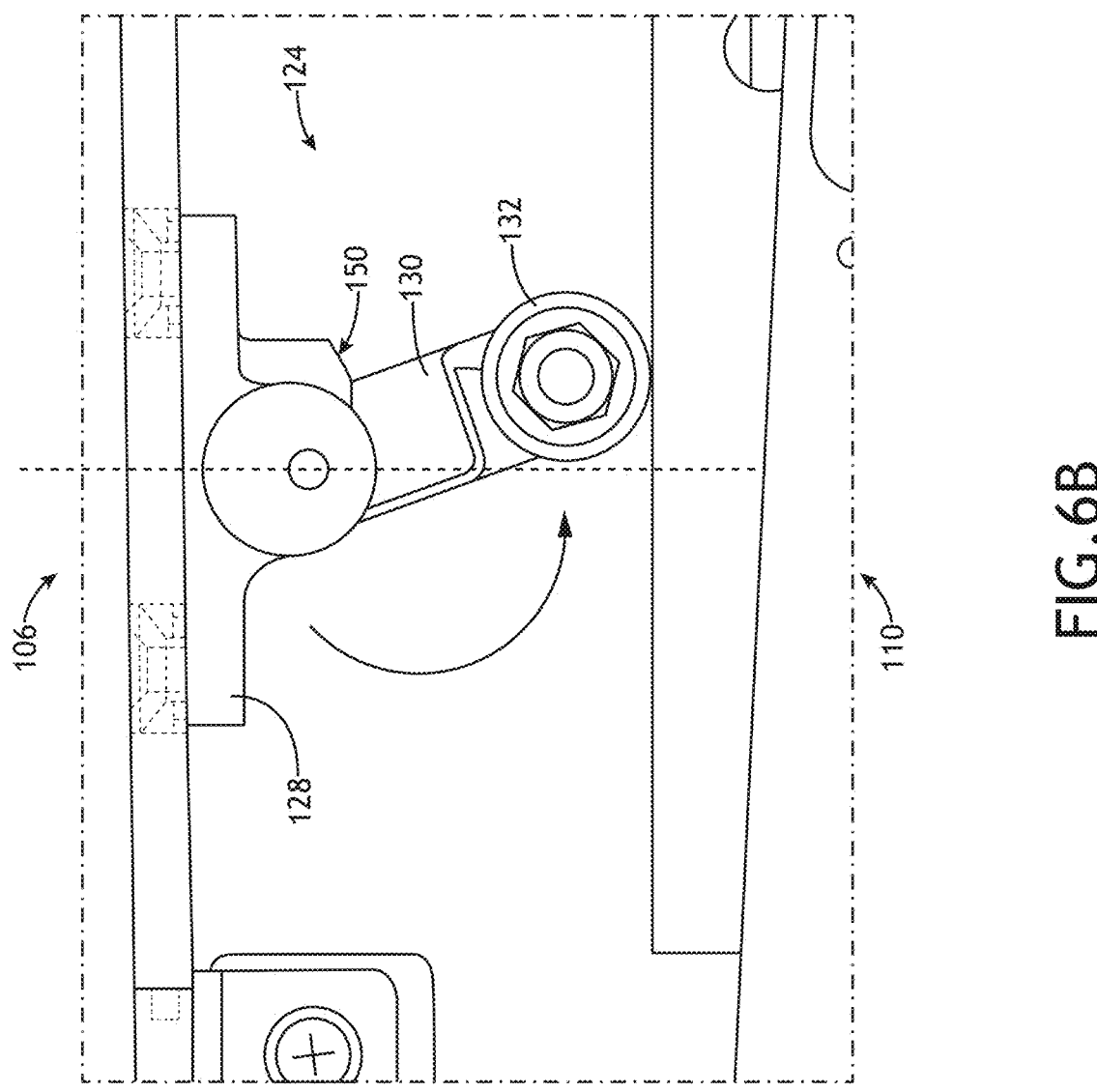
FIG. 6B is a detailed view of FIG. 6A showing the roller support mechanism supporting the berthed backrest subassembly, in accordance with example embodiments of this disclosure.

FIG. 6B illustrates the configuration of the roller support mechanisms 124 when the divan is in the berthing position. When the backrest subassembly moves toward the berthing position, at some point the roller support mechanisms 124 move out of contact with the backrest panel. When this happens, the biasing elements of the roller support mechanisms 124 cause the roller arms 130 to rotate away from their respective mounting block to a position forming a negative angle. The mounting block 128 includes a mechanical stop 150 for preventing further rotation of the roller arm 130 when the roller arm 130 comes into contact with the mechanical stop 150. As evident comparing FIGS. 4B and 6B, it can be seen the stored mechanical force of the biasing element operates to rotate the roller arm 130 about 90 degrees and past vertical between the two extreme positions of the roller arm 130. The biasing element maintains a constant biasing force against the roller arm 130 which maintains the roller arm 130 in contact with the mechanical stop. In this configuration, the mechanical stop 150 functions as a rotation limiter that positions each roller arm 130 in a braced support position. When the divan moves toward the seating position, the rollers arms 130, which are angled forward, are presented for contact with the backrest panel which causes the roller arms 130 to rotate back toward the position shown in FIG. 4B. In other words, the roller arm 130 is shown 'deployed' in FIG. 6B and 'retracted' in FIG. 4B.

Figure 7A:
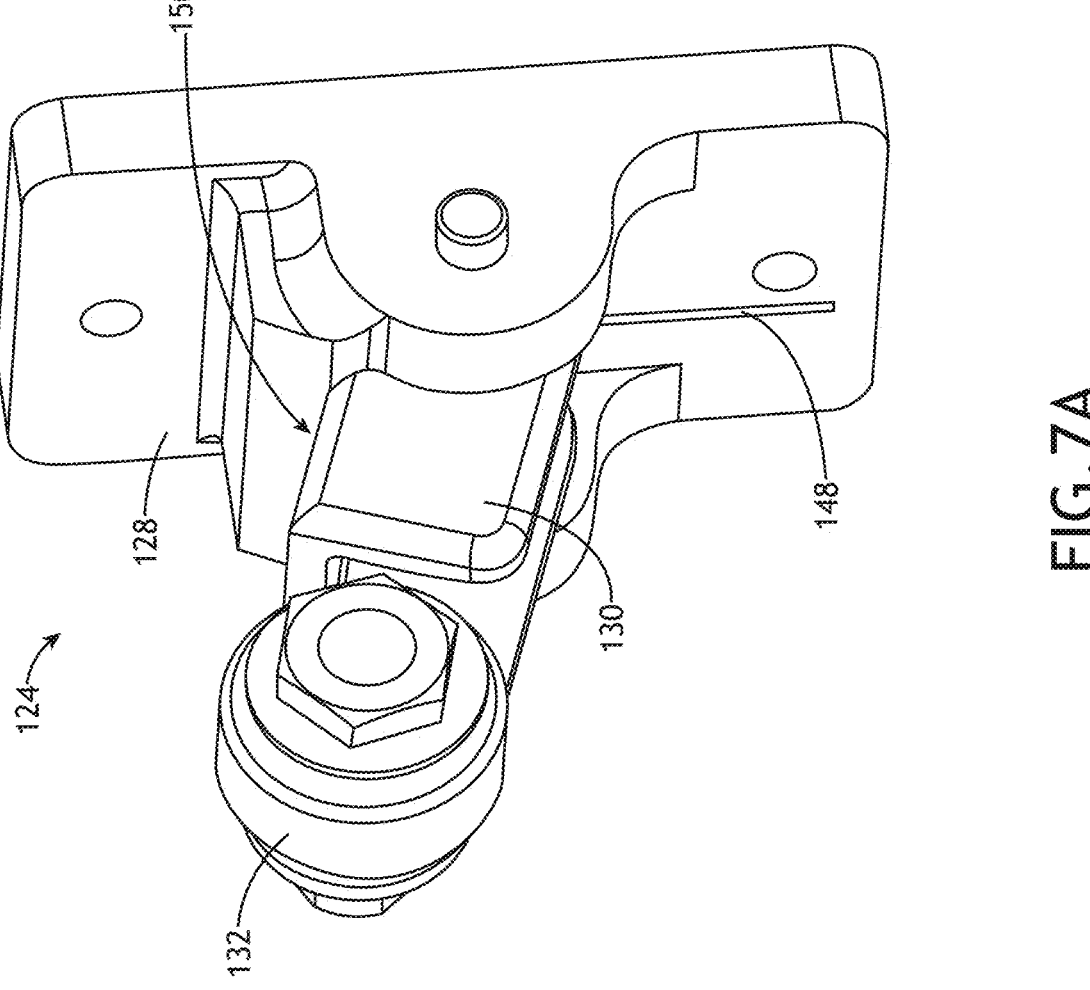
FIG. 7A is an isometric view of the roller support mechanism shown in a support position, in accordance with example embodiments of this disclosure.
Figure 7B:
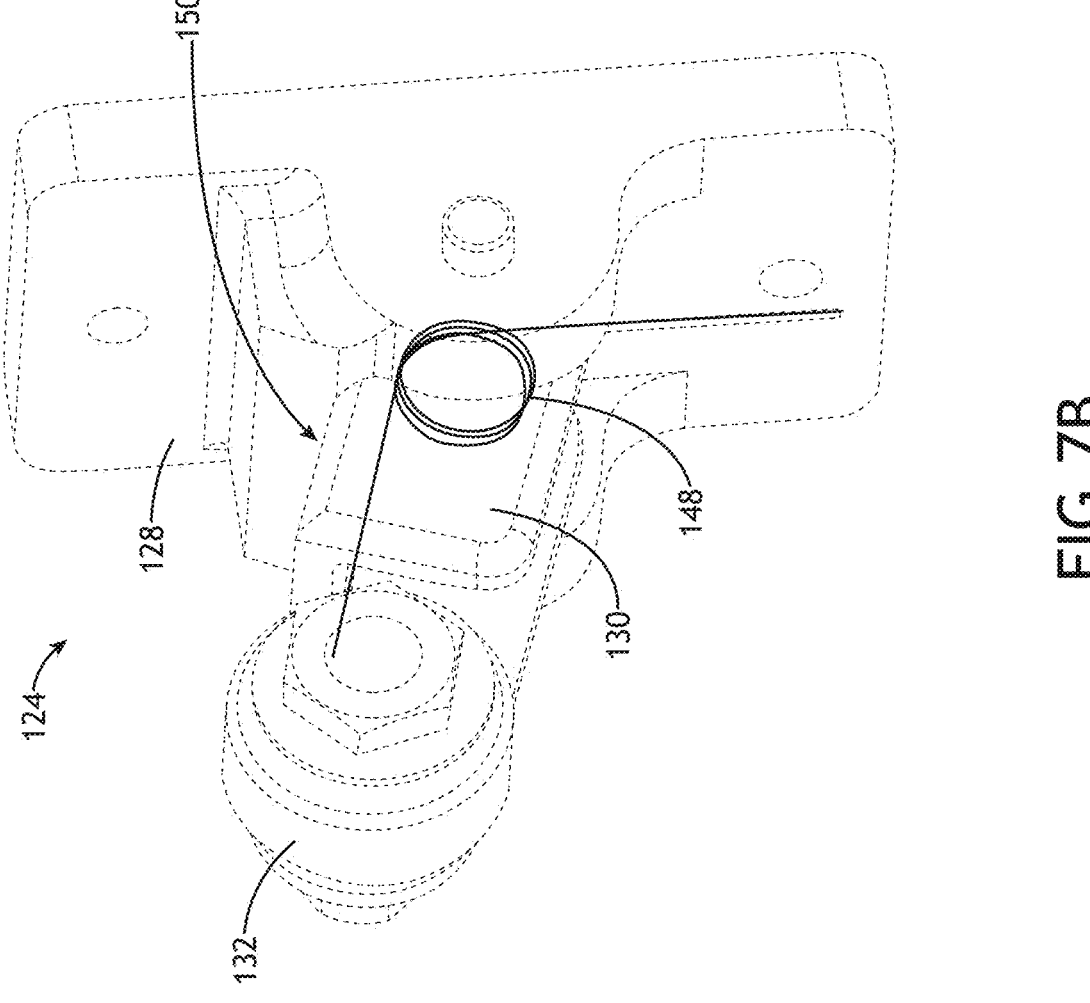
FIG. 7B is an isometric view of the roller support mechanism of FIG. 7A shown in phantom to illustrate the spring force in use, in accordance with example embodiments of this disclosure.

FIGS. 7A and 7B illustrate the configuration of the roller support mechanism 124 when the divan is in the berthing position. When out of contact with the backrest panel, the roller arm 130, under the biasing force of the biasing element such as the torsion spring 148, is caused to rotate away from the mounting block 128 (i.e., opposite rotational direction than caused by the transition to the seating position). In other words, the stored mechanical force in the torsion spring 148 is released, at least in part, to cause the roller arm 130 to rotate and 'lock' in contact with the rotation limiter 150. In this configuration, the roller arm 130 is angled such that contact with the frame subassembly further urges the roller arm 130 into contact with the rotation limiter 150 such that the roller support mechanisms 124 can operate to support the backrest subassembly on the frame assembly.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A divan, comprising:
   a seat bottom subassembly and a backrest subassembly coupled for synchronous motion to transition the divan between a seating position and a berthing position;
   a frame supporting the seat bottom subassembly and the backrest subassembly;
   a backrest panel attached to the frame; and
   a plurality of roller support mechanisms attached to the backrest subassembly, the plurality of roller support mechanisms configured to roll against the backrest panel as the divan transitions between the seating position and the berthing position, and the plurality of roller support mechanisms configured to support the backrest subassembly in each of the seating position and the berthing position of the divan.

2. The divan according to claim 1, wherein:
   each of the plurality of roller support mechanisms is configured to be engaged with the backrest panel when the divan is in the seating position; and
   each of the plurality of roller support mechanisms is configured to be engaged with the frame when the divan is in the berthing position.

3. The divan according to claim 1, wherein each roller support mechanism comprises:
   a mounting block mounted to the backrest subassembly;
   a roller arm rotatably coupled to the mounting block;
   a roller rotatably mounted at one end of the roller arm;
   a rotation limiter provided on the mounting block; and
   a biasing member positioned between the mounting block and the roller arm, the biasing member configured to bias the roller arm toward the rotation limiter.

4. The divan according to claim 3, wherein the biasing member is configured to act on the roller arm to urge the roller into rolling contact with the backrest panel as the divan transitions, and cause the roller arm to rotate into contact with the rotation limiter when the roller support mechanism is out of contact with the backrest panel.

5. The divan according to claim 3, wherein the biasing member is a torsion spring configured to store mechanical energy when the roller comes into rolling contact with the backrest panel when the backrest subassembly transitions toward the seating position.

6. The divan according to claim 3, wherein the roller arm is configured to rotate toward the mounting block as the backrest subassembly transitions toward the seating position, and rotate away from the mounting block as the backrest subassembly transitions toward the berthing position.

7. The divan according to claim 6, wherein, when the divan is in the berthing position, the roller arm is oriented at a negative angle and further rotation of the roller arm is prevented by contact between the roller arm and the rotation limiter.

8. The divan according to claim 1, wherein the backrest panel is devoid of cutouts.

9. The divan according to claim 1, wherein the divan defines at least three seat positions and comprises at least three roller support mechanisms positioned in spaced apart relation.

10. A berthing divan for an aircraft comprising at least two seat positions, the berthing divan comprising:
a seat bottom subassembly and a backrest subassembly coupled for synchronous motion to transition the berthing divan between a seating position and a berthing position;
a fixed headrest assembly;
a frame supporting the seat bottom subassembly, the backrest subassembly, and the fixed headrest assembly;
a backrest panel attached to the frame; and
a plurality of roller support mechanisms attached to the backrest subassembly, the plurality of roller support mechanisms configured to roll against the backrest panel as the berthing divan transitions between the seating position and the berthing position, and the plurality of roller support mechanisms configured to support the backrest subassembly in each of the seating position and the berthing position of the berthing divan.

11. The berthing divan according to claim 10, wherein:
each of the plurality of roller support mechanisms is configured to be engaged with the backrest panel when the berthing divan is in the seating position; and
each of the plurality of roller support mechanisms is configured to be engaged with the frame when the berthing divan is in the berthing position.

12. The berthing divan according to claim 10, wherein each roller support mechanism comprises:
a mounting block mounted to the backrest subassembly;
a roller arm rotatably coupled to the mounting block;
a roller rotatably mounted at one end of the roller arm;
a rotation limiter provided on the mounting block; and
a biasing member positioned between the mounting block and the roller arm, the biasing member configured to bias the roller arm toward the rotation limiter.

13. The berthing divan according to claim 12, wherein the biasing member is configured to act on the roller arm to urge the roller into rolling contact with the backrest panel as the divan transitions, and cause the roller arm to rotate into contact with the rotation limiter when the roller support mechanism is out of contact with the backrest panel.

14. The berthing divan according to claim 13, wherein the biasing member is a torsion spring configured to store mechanical energy when the roller comes into rolling contact with the backrest panel when the backrest subassembly transitions toward the seating position.

15. The berthing divan according to claim 13, wherein the roller arm is configured to rotate toward the mounting block as the backrest subassembly transitions toward the seating position, and rotate away from the mounting block as the backrest subassembly transitions toward the berthing position.

16. The berthing divan according to claim 15, wherein, when the berthing divan is in the berthing position, the roller arm is oriented at a negative angle and further rotation of the roller arm is prevented by contact between the roller arm and the rotation limiter.

17. The berthing divan according to claim 10, wherein the backrest panel is devoid of cutouts.

18. The berthing divan according to claim 10, wherein the berthing divan comprises at least three roller support mechanisms positioned in spaced apart relation.

* * * * *